(12) United States Patent
Flick

(10) Patent No.: US 6,873,824 B2
(45) Date of Patent: Mar. 29, 2005

(54) REMOTE CONTROL SYSTEM USING A CELLULAR TELEPHONE AND ASSOCIATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 484 days.

(21) Appl. No.: 09/934,997

(22) Filed: Aug. 22, 2001

(65) Prior Publication Data

US 2002/0098835 A1 Jul. 25, 2002

Related U.S. Application Data

(60) Provisional application No. 60/226,854, filed on Aug. 22, 2000, and provisional application No. 60/247,131, filed on Nov. 10, 2000.

(51) Int. Cl.[7] .............................. H04B 5/00; H04M 1/66; H04M 3/00; H04Q 7/20; B06R 25/10
(52) U.S. Cl. ...................... 455/41.2; 455/410; 455/420; 455/425; 340/426.3
(58) Field of Search ............................... 455/41.1, 41.2, 455/66.1, 410, 411, 414.1, 418–420, 425; 340/426.13, 426.14, 426.16, 426.17, 426.18, 426.2, 426.28, 426.29, 426.3, 426.36, 825.69, 825.71, 825.72, 825.73

(56) References Cited

U.S. PATENT DOCUMENTS

| | | | | |
|---|---|---|---|---|
| 3,821,651 A | * | 6/1974 | Fathauer et al. ......... | 455/166.1 |
| 4,905,270 A | * | 2/1990 | Ono ....................... | 455/569.2 |
| 5,081,667 A | | 1/1992 | Drori et al. .................... | 379/59 |
| 5,225,713 A | | 7/1993 | Henneberry et al. ........ | 307/102 |
| 5,247,564 A | | 9/1993 | Zicker ......................... | 379/40 |
| 5,276,728 A | | 1/1994 | Pagliaroli et al. ............. | 379/58 |
| 5,370,201 A | | 12/1994 | Inubushi .................... | 180/287 |
| 5,448,218 A | | 9/1995 | Espinosa .................... | 340/426 |
| 5,513,244 A | | 4/1996 | Joao et al. .................... | 379/58 |
| 5,515,043 A | | 5/1996 | Berard et al. ............... | 340/988 |
| 5,535,844 A | | 7/1996 | Samford .................... | 180/287 |
| 5,563,453 A | | 10/1996 | Nyfelt ...................... | 307/10.2 |
| 5,563,600 A | * | 10/1996 | Miyake ..................... | 341/173 |
| 5,612,878 A | | 3/1997 | Joao et al. ............ | 364/424.045 |
| 5,742,227 A | | 4/1998 | Escareno et al. ........... | 340/426 |
| 5,805,057 A | | 9/1998 | Eslaminovin ............... | 340/426 |
| 5,815,557 A | | 9/1998 | Larson ................... | 379/102.06 |
| 5,874,785 A | | 2/1999 | Liu ........................... | 307/10.5 |
| 5,917,405 A | | 6/1999 | Joao ........................ | 340/426 |
| 5,926,086 A | | 7/1999 | Escareno et al. .......... | 340/426 |
| 5,933,090 A | * | 8/1999 | Christenson .......... | 340/825.69 |
| 5,937,065 A | * | 8/1999 | Simon et al. ............... | 380/262 |
| 5,940,007 A | * | 8/1999 | Brinkmeyer et al. ... | 340/825.69 |
| 5,945,921 A | * | 8/1999 | Seo et al. .............. | 340/825.69 |

(Continued)

Primary Examiner—William Trost
Assistant Examiner—Meless Zewdu
(74) Attorney, Agent, or Firm—Allen, Dyer, Doppelt, Milbrath & Gilchrist, P.A.

(57) ABSTRACT

A vehicle remote control system is operated directly via a cellular telephone without using intervening cellular communications infrastructure. The cellular telephone includes an input device and a transmitter for transmitting signals relating to a command code entered from the input device and a unique identification code for the cellular telephone. The vehicle remote control system includes a receiver positioned at the vehicle for receiving signals directly from the cellular telephone without using intervening cellular communications infrastructure. A controller is also positioned at the vehicle and is switchable between a learning mode and an operating mode. When the controller is in the learning mode, the controller learns the unique identification code of a cellular telephone so that the cellular telephone is an authorized cellular telephone. When the controller is in the operating mode, the controller controls at least one vehicle function responsive to signals received from the authorized cellular telephone.

40 Claims, 6 Drawing Sheets

U.S. PATENT DOCUMENTS

| | | | |
|---|---|---|---|
| 5,990,785 A | 11/1999 | Suda | 340/426 |
| 6,011,321 A | 1/2000 | Stancu et al. | 307/10.5 |
| 6,161,005 A * | 12/2000 | Pinzon | 455/403 |
| 6,424,056 B1 * | 7/2002 | Irvin | 307/10.1 |

* cited by examiner

REMOTE CONTROL SYSTEM USING A CELLULAR TELEPHONE AND ASSOCIATED METHODS

RELATED APPLICATIONS

This application is based upon prior filed copending provisional application No. 60/226,854 filed Aug. 22, 2000, and provisional application No. 60/247,131 filed Nov. 10, 2000, the entire disclosures of which are incorporated herein by reference.

FIELD OF THE INVENTION

The present invention relates to control systems, and more particularly, to a remote control system, such as for a vehicle, and which uses a cellular telephone as a remote transmitter for transmitting control signals.

BACKGROUND OF THE INVENTION

Many vehicles include a security system, remote keyless entry system, and/or remote start system which permit a user to perform a function when away from the vehicle. For example, the security system may be switched between armed and disarmed modes by operation of a small handheld remote transmitter. Similarly, remote keyless entry and remote engine starting features can be similarly performed using a suitable remote transmitter. Typically such transmitters are dedicated and sold as part of the overall remote control system. Such systems can be factory installed or added as aftermarket accessories.

A number of patents relate to using a cellular telephone as a remote transmitter for operating a vehicle control system, such as for example, U.S. Pat. No. 5,612,878 to Joao et al. In other words, in such a system, the cellular telephone can be used as the remote transmitter to control a function at the vehicle.

Similarly, U.S. Pat. No. 5,815,557 to Larson also discloses a cellular telephone which transmits to a lock and wherein the user operates the buttons of the telephone as he would buttons on a key card to gain access to the secured area. U.S. Pat. No. 5,276,728 to Pagliaroli et al. discloses a vehicle security system including a short range portable transmitter that may be used to transmit a command code to the receiver which may be in the same frequency ranges as the cellular telephone transmitters. U.S. Pat. Nos. 5,370,201 to Inubshi, U.S. Pat. No. 5,535,844 to Samford, and U.S. Pat. No. 5,917,405 to Joao also disclose a cellular telephone communicating with a receiver at the vehicle.

Unfortunately, none of the above identified prior art patents address how a cellular telephone or its associated vehicle receiver can be configured to operate together easily and while providing security from unauthorized operation by other cellular telephones. In addition, these cellular telephones typically require the use of intervening cellular communications infrastructure, i.e., relay towers or base stations, when used as a remote transmitter. The use of relay towers or base stations by a cellular telephone often results in an expense to the user.

SUMMARY OF THE INVENTION

In view of the foregoing background, it is therefore an object of the invention to provide a remote control system and related methods with an enhanced security of operation.

Another object of the invention is to avoid being charged by the cellular network provider when using a cellular telephone as a remote transmitter.

These and other objects, features and advantages in accordance with the present invention are provided by a vehicle remote control system to be operated directly via a cellular telephone without using intervening cellular communications infrastructure. The cellular telephone comprises an input device, such as a keypad for example, and a transmitter for transmitting signals relating to a command code entered from the input device and a unique identification code for the cellular telephone.

The vehicle remote control system comprises a receiver positioned at the vehicle for receiving signals directly from the cellular telephone without using intervening cellular communications infrastructure, and a controller also positioned at the vehicle that is switchable between a learning mode and an operating mode.

When the controller is in the learning mode, the controller learns the unique identification code of a cellular telephone so that the cellular telephone is an authorized cellular telephone. When the controller is in the operating mode, the controller controls at least one vehicle function responsive to signals received from the authorized cellular telephone. The controller may be switchable to the learning mode responsive to a user operable switch connected thereto, or a user operable in combination with at least one vehicle device.

A cellular telephone is advantageously used to transmit signals to the remote control system so that the transmission range may be further than provided by typical handheld remote transmitters. The user does need not to carry both a cellular telephone and a handheld remote transmitter since the cellular telephone is used for both conventional calls and remote vehicle operations.

In addition, since the cellular telephone transmits signals to the remote control system without using intervening cellular communications infrastructure, i.e., without using relay towers or base stations, the user will avoid being charged for transmitting such signals. This is possible when the controller is selectively responsive to command codes from the cellular telephone having less than seven digits. That is, the command code is less than a typical seven digit telephone number so that a cellular telephone relay tower or base station does not recognize the command code as such, and consequently, will not process the call. Even though the cellular telephone transmits signals directly to the remote control system without using intervening cellular communications infrastructure, the cellular telephone communicates with the intervening cellular communications infrastructure (i.e., one or more relay stations and/or a base station) so that the cellular telephone is operational. Once the cellular telephone is operational, then the command code and the unique identification signal may be directly transmitted to the remote control system.

The controller may cooperate with the receiver to learn the unique identification code of the cellular telephone by wireless reception from the cellular telephone. To prevent the controller from learning a unique identification code from adjacent cellular telephones when in the learning mode, the receiver has a controllable sensitivity. When the receiver has a reduced sensitivity, the cellular telephone must be placed closely adjacent the receiver when in the learning mode.

Another embodiment of the present invention is to interface the cellular telephone via a cable to an electrical connector on the controller to learn the unique identification code. In other words, an RF transmission from the cellular telephone may be avoided when the controller learns the unique identification code of the cellular telephone.

Various embodiments of the controller are provided for the vehicle remote control system. In one embodiment the controller comprises a security controller switchable between armed and disarmed modes responsive to signals from an authorized cellular telephone. In another embodiment, the controller comprises a door lock controller for locking or unlocking at least one vehicle door responsive to signals from an authorized cellular telephone. In yet another embodiment, the controller comprises an engine start controller for starting a vehicle engine responsive to signals from an authorized cellular telephone.

Another aspect of the invention is a method for vehicle remote control directly via a cellular telephone without using intervening cellular communications infrastructure. As discussed above, the cellular telephone includes an input device and a transmitter for transmitting signals relating to a command code entered from the input device and a unique identification code for the cellular telephone.

The method preferably includes receiving signals directly from the cellular telephone at the vehicle without using intervening cellular communications infrastructure, and switching the controller positioned at the vehicle to a learning mode and learning the unique identification code of a cellular telephone so that the cellular telephone is an authorized cellular telephone. The method preferably further includes switching the controller to an operating mode and controlling at least one vehicle function responsive to signals received from the authorized cellular telephone.

Another aspect of a remote control system according to the invention is directed to a door opening system. The door opening system, such as a garage door, is to be operated directly via a cellular telephone without using intervening cellular communications infrastructure.

Yet another aspect of the remote control system is directed to a building security system to be operated directly via a cellular telephone without using intervening cellular communications infrastructure. The building controller may be switchable between an armed mode for generating an alarm responsive to a building sensor, and a disarmed mode. In addition, the building controller may also be connected to at least at least one door lock for unlocking the door lock responsive to the signals received from the authorized cellular telephone.

DETAILED DESCRIPTION OF THE PREFERRED EMBODIMENTS

Figure 1:
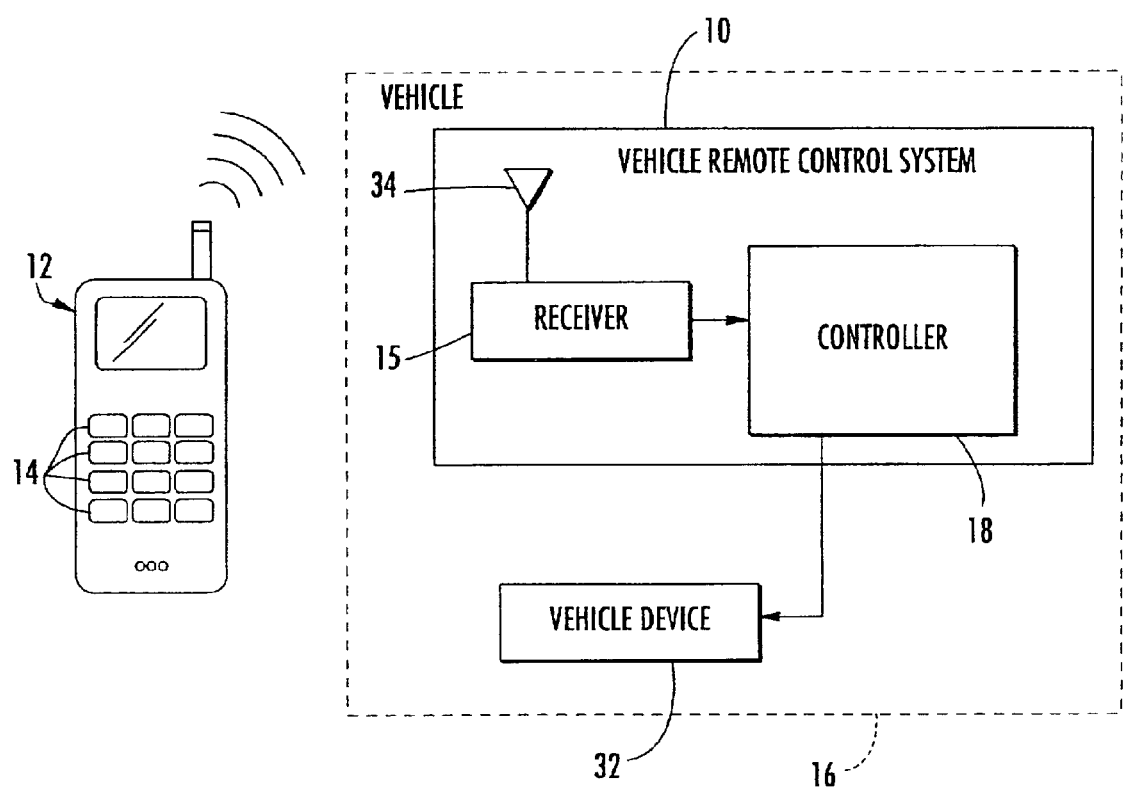
FIG. 1 is a schematic diagram of a vehicle remote control system in accordance with the present invention.

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime and multiple prime notation are used in alternate embodiments to indicate similar elements.

A vehicle remote control system 10 in accordance with the present invention will be described with reference to FIGS. 1–5. The vehicle remote control system 10 is operated directly via a cellular telephone 12 without using intervening cellular communications infrastructure, i.e., without using relay towers or base stations. However, those of skill in the art will readily appreciate that the cellular telephone 12 is in communications with the intervening cellular communications infrastructure so that the cellular telephone is active (i.e., operational). Once the cellular telephone 12 is active, communication with the vehicle remote control system 10 is performed without using the intervening cellular communications infrastructure. The cellular telephone 12 includes an input device, such as a keypad 14 for example, and a transmitter included therein for transmitting signals relating to a command code entered from the keypad, and a unique identification code for the cellular telephone.

The remote control system 10 includes a receiver 15 positioned at the vehicle 16 with an antenna 34 connected thereto for receiving signals directly from the cellular telephone 12 without using intervening cellular communications infrastructure. A controller 18 is also positioned at the vehicle 16 and is switchable between a learning mode and an operating mode. When the controller 18 is in the learning mode, the controller learns the unique identification code of the cellular telephone 12 so that the cellular telephone is an authorized cellular telephone.

When the controller 18 is in the operating mode, the controller controls at least one vehicle function responsive to signals received from the authorized cellular telephone 12. The at least one vehicle function is supported by the vehicle device 32 connected to the controller 18. The at least one vehicle function may include switching between armed and disarmed modes, remotely locking and unlocking the vehicle doors, or remote engine starting.

As will be discussed in greater detail below, the vehicle remote control system 10 includes various embodiments. In one embodiment, the controller 18 is a security controller 18' that switches between armed and disarmed modes responsive to signals form the cellular telephone 12. In another embodiment, the controller 18 is a door lock controller 18" for locking or unlocking at least one vehicle door 28 responsive to signals form the cellular telephone 12. In a third embodiment, the controller 18 is an engine start controller 18'" for starting a vehicle engine responsive to signals form the cellular telephone 12.

A cellular telephone 12 is advantageously used to transmit signals to the remote control system 10 so that the transmission range may be further than provided by typical handheld remote transmitters. The user does need not to carry both a cellular telephone 12 and a handheld remote transmitter since the cellular telephone is used for both conventional calls and remote vehicle operations.

In addition, since the cellular telephone 12 transmits signals to the remote control system 10 without using intervening cellular communications infrastructure, i.e., without using relay towers or base stations, the user will avoid being charged for transmitting such signals. Even though the cellular telephone 12 must register with the intervening cellular communications infrastructure, this is possible when the controller 18 is selectively responsive to command codes from the cellular telephone 12 having less than seven digits. That is, the command code is less than a typical seven digit telephone number so that a cellular telephone relay tower or base station does not recognize the command code as a telephone number. The learning mode of the controller 18 for learning the unique codes of the cellular telephone 12 will be discussed in greater detail below.

Figure 2:
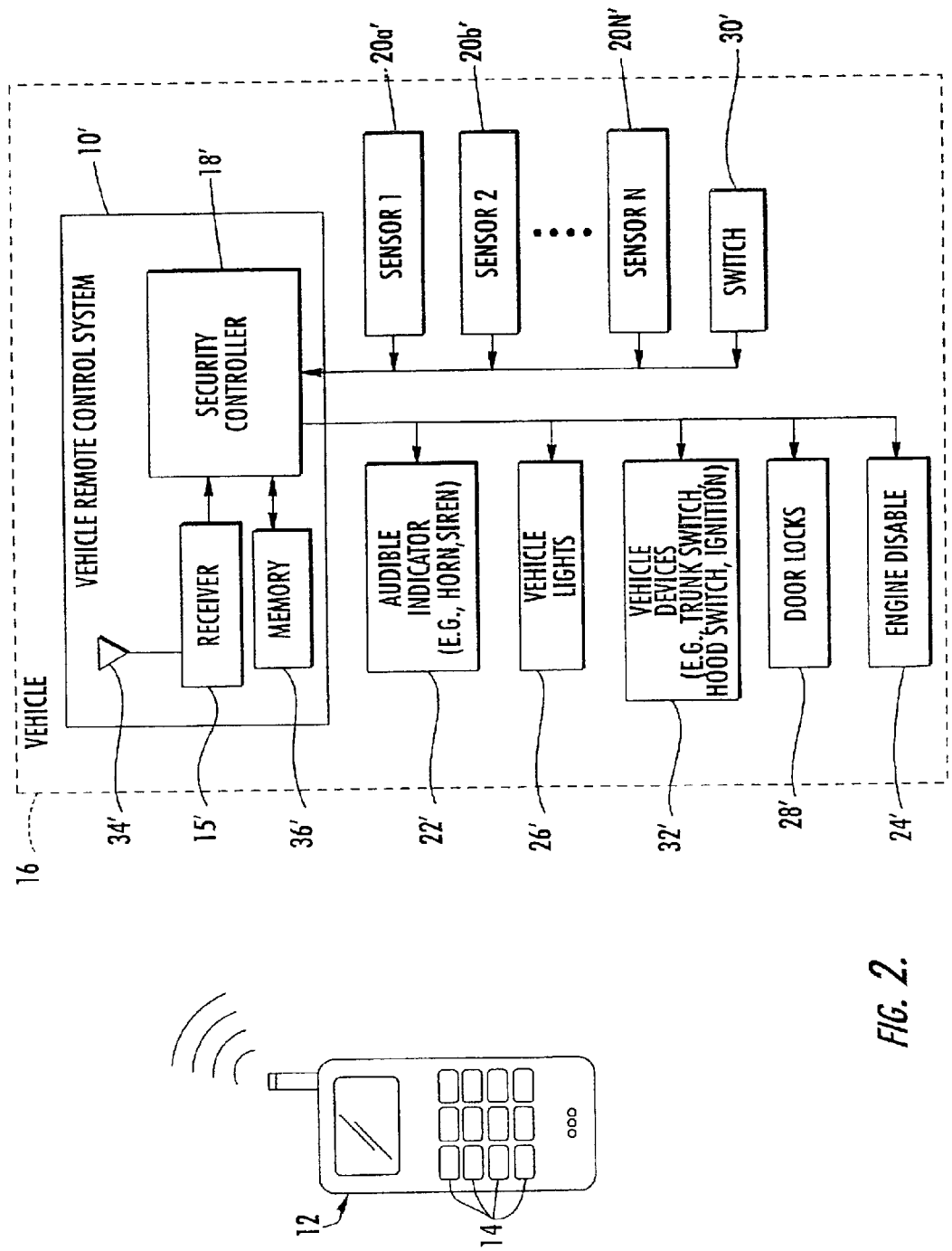
FIG. 2 is a schematic diagram of a vehicle remote control system including a security controller in accordance with the present invention.

In the illustrated embodiment of FIG. 2, a security controller 18' is connected to a number of security sensors $20a'$–$20n'$, which may include door, trunk, and/or hood pin switches, as well as shock, proximity, or other types of sensors as will be understood by those skilled in the art. The security controller 18' monitors the sensors $20a'$–$20n'$ and if the security controller is in an armed mode, for example, a sensor $20a'$–$20n'$ may trigger an alarm indicator at the vehicle 16. If the security controller 18' is in the disarmed mode, an alarm indicator is not generated, and normal operation of the vehicle 16 is typically permitted.

The security controller 18' may be switched between armed and disarmed modes to permit operation by the user (disarmed mode), and to protect the vehicle 16 when the user is away from the vehicle (armed mode). An authorized cellular telephone 12 is used to switch the security controller 18' between the armed and disarmed modes. The security controller 18' may also include a passive arming feature which automatically arms the controller based upon the user exiting the vehicle 16.

The security controller 18' may also be connected to an engine disable circuit or device 24' which can prevent or disable starting and/or running of the vehicle engine. This would typically be used when an alarm was triggered by one or more of the security sensors $20a'$–$20n'$.

An audible indicator 22', such as the vehicle horn or a siren, is also illustratively connected to the security controller 18'. The audible indicator 22' is used to sound an alarm condition, for example, but is also used to provide an audible indication that the security controller 18' has been commanded or has already changed modes. The audible confirmation indication is usually of short duration and/or amplitude and is typically known as a confirmation chirp.

Vehicle lights 26' are also illustratively connected to the security controller 18'. The lights 26' may be flashed during an alarm indication. In addition, the lights 26' may also be flashed along with the confirmation chirp when the security controller 18' is switched between armed and disarmed modes. For example, one audible chirp and light flash may be given to confirm that the security controller 18' has been switched to the armed mode. Two flashes and chirps may be used to indicate that the security controller 18' has been disarmed. Other combinations are also possible as will be appreciated by those skilled in the art.

In the illustrated embodiment, power door locks 28' may also be connected to the security controller 18'. For example, the security controller 18' could cause the power door locks 28' to move to the unlocked position when the user returns to the vehicle 16 and switches the controller to the disarmed mode. Conversely, the security controller 18' could move the door locks 30' to the locked position upon the user switching the controller to the armed mode.

Placing the security controller 18' in the learning mode will now be discussed. The vehicle remote control system 10' further includes a user operable switch 30' connected to the security controller 18'. The user operable switch 30' is preferably hidden from view within the vehicle 16, e.g., under the dash, yet is readily accessible by the user. The security controller 18' is switchable to the learning mode responsive to the user operable switch 30'. A designated switch, such as a valet switch, for example, can be used to cause the security controller 18' to switch to the learning mode.

In another embodiment, the security controller 18' is switchable to the learning mode responsive to the user operable switch 30 and responsive to at least one vehicle device 32'. The at least one vehicle device 32' may include trunk, door and hood switches, and even the ignition switch, for example. The function of these vehicle devices 32' may overlap a portion of the illustrated sensors $20a'$–$20n'$. The designated switch 30' in combination with a vehicle device 32' can be used to cause the security controller 18' to switch to the learning mode.

The receiver 15' has a controllable sensitivity so that when the security controller 18' is in the learning mode, the controller reduces the sensitivity of the receiver. Consequently, the cellular telephone 12 must be placed closely adjacent the antenna 34' of the receiver 15' so that when the user presses 'SEND' on the keypad 15' of the cellular telephone, the security controller 18' learns the unique identification code of the cellular telephone.

By reducing the sensitivity of the receiver 15', this avoids the security controller 18' from learning a unique identification code from adjacent cellular telephones. Once this has been performed, the cellular telephone 12 becomes an authorized cellular telephone so that when the security controller 18' is in the operating mode, it is switchable between armed and disarmed modes.

As readily understood by one skilled in the art, a typical cellular telephone 12 sends coded identifying information along with the speech information. The coded identifying information includes, for U.S. cellular telephones, for example, an electronic serial number (ESN) and a mobile identification number (MIN), with each transmission. The ESN corresponds to the unique identification code of the cellular telephone 12, for example. The ESN may be fixed but not unique, while the MIN is typically unique. The MIN is typically the phone number for the cellular telephone 12, for example.

However, as noted above, the security controller 18' may be selectively responsive to command codes having less than seven digits from the cellular telephone 12. This is done so that when the cellular telephone 12 transmits signals to the remote control system 10', it is done without using intervening cellular communications infrastructure.

When the security controller 18' is in the operating mode, the controller controls at least one vehicle function by switching between armed and disarmed modes responsive to signals received from the authorized cellular telephone 12. In other words, the security controller 18' is responsive to a particular command code transmitted by the cellular telephone 12. For example, pressing "1" and then "SEND" may switch the security controller 18' to an armed mode, whereas pressing "2" and then "SEND" may switch the security controller to a disarm mode. The security controller 18' compares the unique identification code transmitted by the cellular telephone 12 to a learned unique identification code. The learned unique identification code may be stored in a memory internal to the security controller 18' or in an external memory, such as memory 36'.

In addition, for certain cellular telephone systems, the frequency on which the cellular telephone 12 transmits may change from time-to-time, such as to avoid adjacent or co-channel interference. Accordingly, the receiver 15' may include a frequency scanning feature to scan the available frequencies to find the cellular telephone of interest as will also be appreciated by those skilled in the art. Of course, some cellular systems may not need such dynamic frequency reallocation, and the scanning portion would then not be needed.

The receiver 15' and the security controller 18' in accordance with the invention includes circuitry and/or software to enter the learning mode and learn the unique identification code or codes from the cellular telephone 12, so that the cellular telephone is then authorized to operate a designated vehicle function. Of course, other unique or coded signals could be transmitted from the cellular telephone 12 and learned by the receiver 15' and the security controller 18'. For example, the cellular telephone 12 could include a transmitter portion (not shown) like a conventional remote handheld vehicle security transmitter. The remote transmitter could also be carried in a flip out portion of a cellular telephone housing, for example. The learning mode may be entered by any of a number of methods as will be appreciated by those skilled in the art. In addition, the cellular telephone 12 could be voice activated so that the signals transmitted therefrom could be initiated without using the keypad 14.

Referring now to FIG. 2, another embodiment of the vehicle remote control system 10" includes a door lock controller 18" connected to the door locks 28". Operation of the door lock controller 18" is similar to the security controller 18' and will not be discussed in great detail. However, when the door lock controller 18– is in the operating mode, the controller unlocks or locks the door locks 28" of the vehicle 16 responsive to signals received from the authorized cellular telephone 12. For example, pressing "1" and then "SEND" may unlock the doors of the vehicle 16, whereas pressing "2" and then "SEND" may lock the doors of the vehicle.

Figure 3:
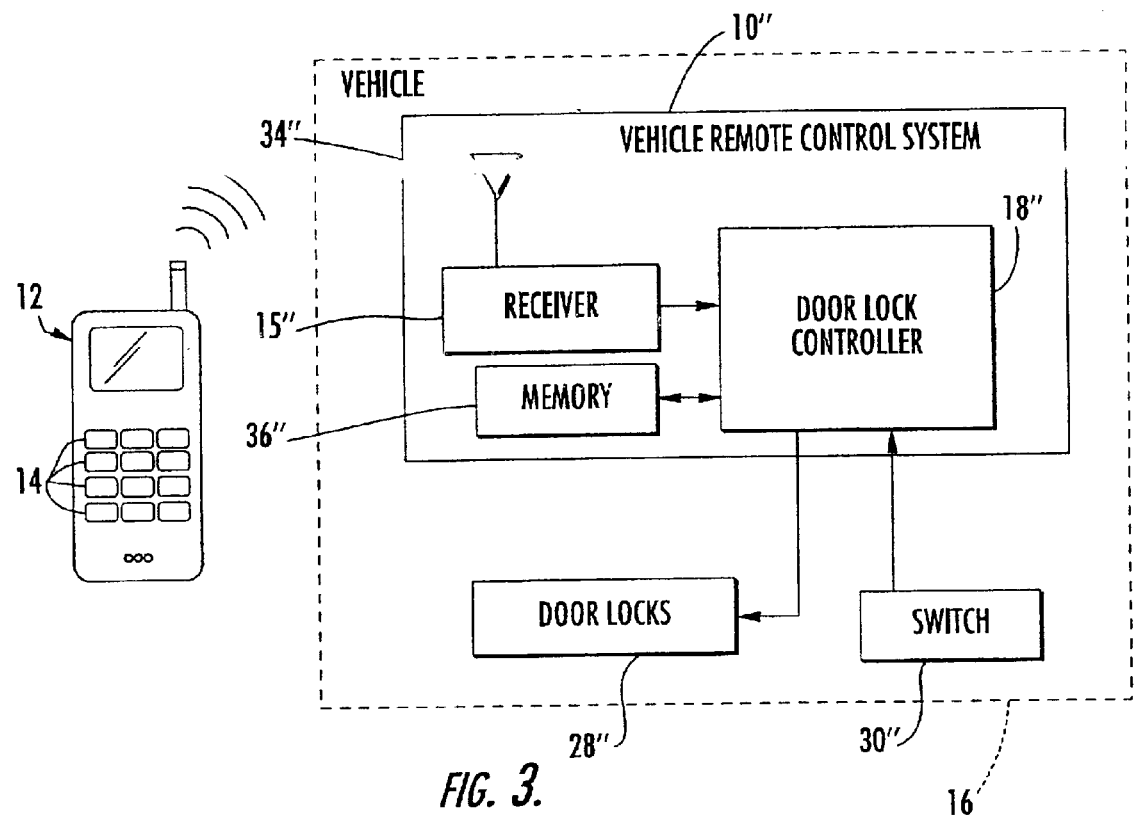
FIG. 3 is a schematic diagram of a vehicle remote control system including a door lock controller in accordance with the present invention.
Figure 4:
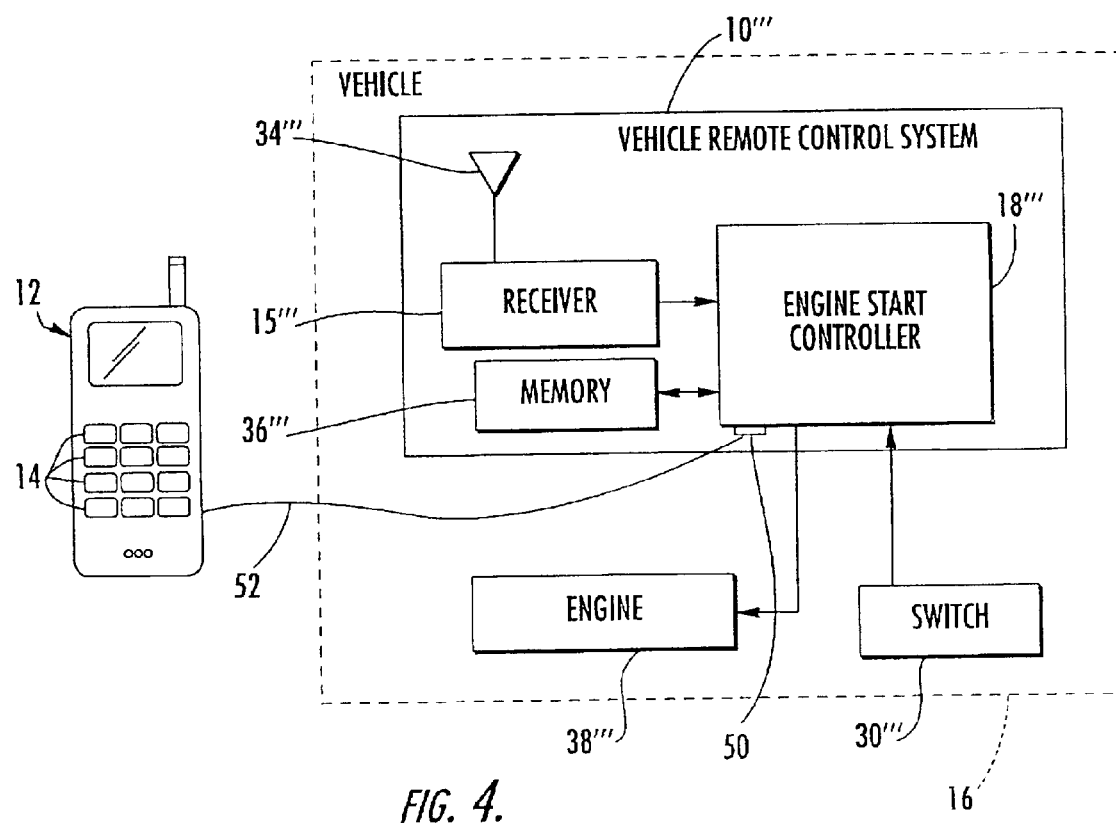
FIG. 4 is a schematic diagram of a vehicle remote control system including an engine start controller in accordance with the present invention.

Referring now to FIG. 3, another embodiment of the vehicle remote control system 10''' includes an engine start controller 18''' connected to the vehicle's engine 38'''. Operation of the engine start controller 18''' is similar to the security controller 18' and will not be discussed in great detail. However, when the engine start controller 18''' is in the operating mode, the controller starts the engine 38''' responsive to signals received from the authorized cellular telephone 12. For example, pressing "1" and then "SEND" may start the engine 38'''.

An alternate approach to the learning mode for entering the unique identification code from the cellular telephone 12 avoids the free space transmission of these signals. Many cellular telephones include a signal output jack so that a separate antenna and/or antenna and amplifier combination can be connected thereto, such as for connecting and operating a cellular telephone in a vehicle, for example.

In accordance with this aspect of the invention, an electrical connector 50''' is coupled to the engine start controller 18''' and cooperates therewith via a cable 52 to permit the engine start controller to interface with the cellular telephone 12 to learn the codes from the cellular telephone. The engine start controller 18''' can be temporarily electrically connected to the output jack of the cellular telephone 12 to learn its unique identification code as described above. Alternatively, the cellular telephone 12 may be temporarily directly connected to the electrical connector 50''' in lieu of using the cable 52. These variations of the invention, which are also applicable to the respective vehicle remote control systems illustrated in FIGS. 1–3, reduce the possibility of learning a code from an undesired telephone operating in proximity during learning of the desired telephone.

Figure 5:
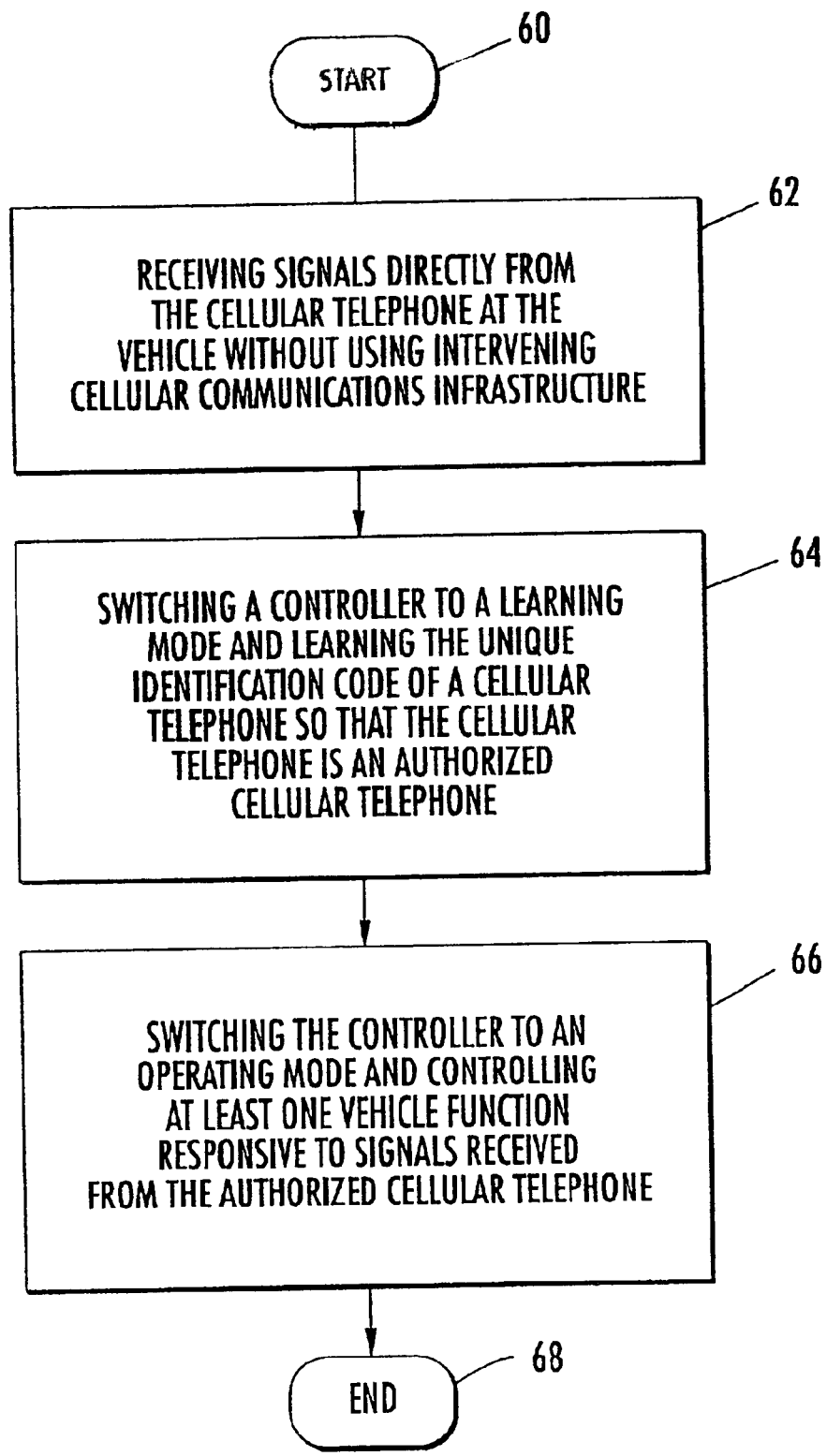
FIG. 5 is a flowchart illustrating a method for vehicle remote control directly via a cellular telephone in accordance with the present invention.

A method aspect for vehicle remote control directly via a cellular telephone 12 without using intervening cellular communications infrastructure will now be discussed with reference to FIG. 5. As discussed above, the cellular telephone 12 includes a keypad 14 and a transmitter for transmitting signals relating to a command code entered from the keypad and a unique identification code for the cellular telephone.

From the start (Block 60) the method includes receiving signals directly from the cellular telephone 12 at the vehicle 16 without using intervening cellular communications infrastructure (Block 62), and switching the controller 18 positioned at the vehicle 16 to a learning mode and learning the unique identification code of a cellular telephone 12 so that the cellular telephone is an authorized cellular telephone at Block 64. The method further includes switching the controller 18 to an operating mode and controlling at least one vehicle function responsive to signals received from the authorized cellular telephone 12 at Block 66. The method ends at Block 68.

Figure 6:
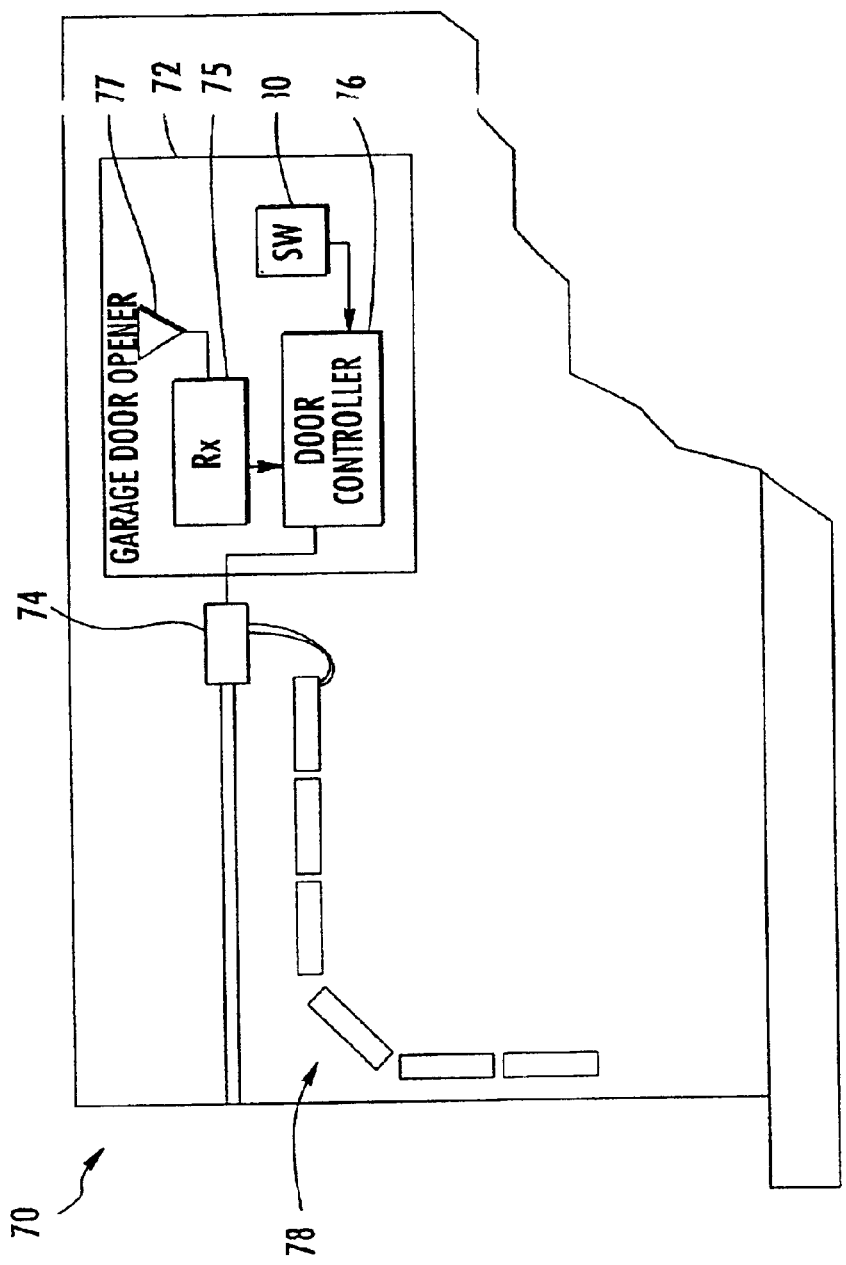
FIG. 6 is a schematic diagram of a remote control system for opening a garage door in accordance with the present invention.
Figure 6:
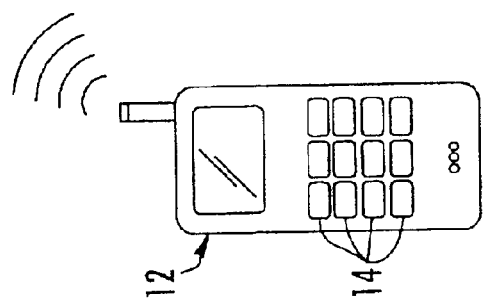

Another illustrative embodiment of a remote control system according to the invention is understood with reference to FIG. 6. The illustrated door opening system 70 includes a conventional overhead door opener 72, such as for a garage. The door opener 72, in turn, includes a motor 74 and receiver 75/door controller 76 as would be readily understood by one skilled in the art. An antenna 77 is connected to the receiver 75. The illustrated segmented garage door 78 is guided by a pair of opposing tracks, not shown.

More particularly, the door opening system is to be operated directly via a cellular telephone 12 without using intervening cellular communications infrastructure. The cellular telephone 12 includes a keypad 14 and a transmitter for transmitting signals relating to a command code entered from the keypad and a unique identification code for the cellular telephone.

The illustrated receiver 75 is associated at the door for receiving signals directly from the cellular telephone 12 without using intervening cellular communications infrastructure. The door controller 76 is switchable between a learning mode (via switch 80) and an operating mode. When the door controller 76 is in the learning mode, it learns the unique identification code of a cellular telephone so that the cellular telephone is an authorized cellular telephone. When the door controller 76 is in the operating mode, it moves the door 78 between open and closed positions responsive to signals received from the authorized cellular telephone 12.

Figure 7:
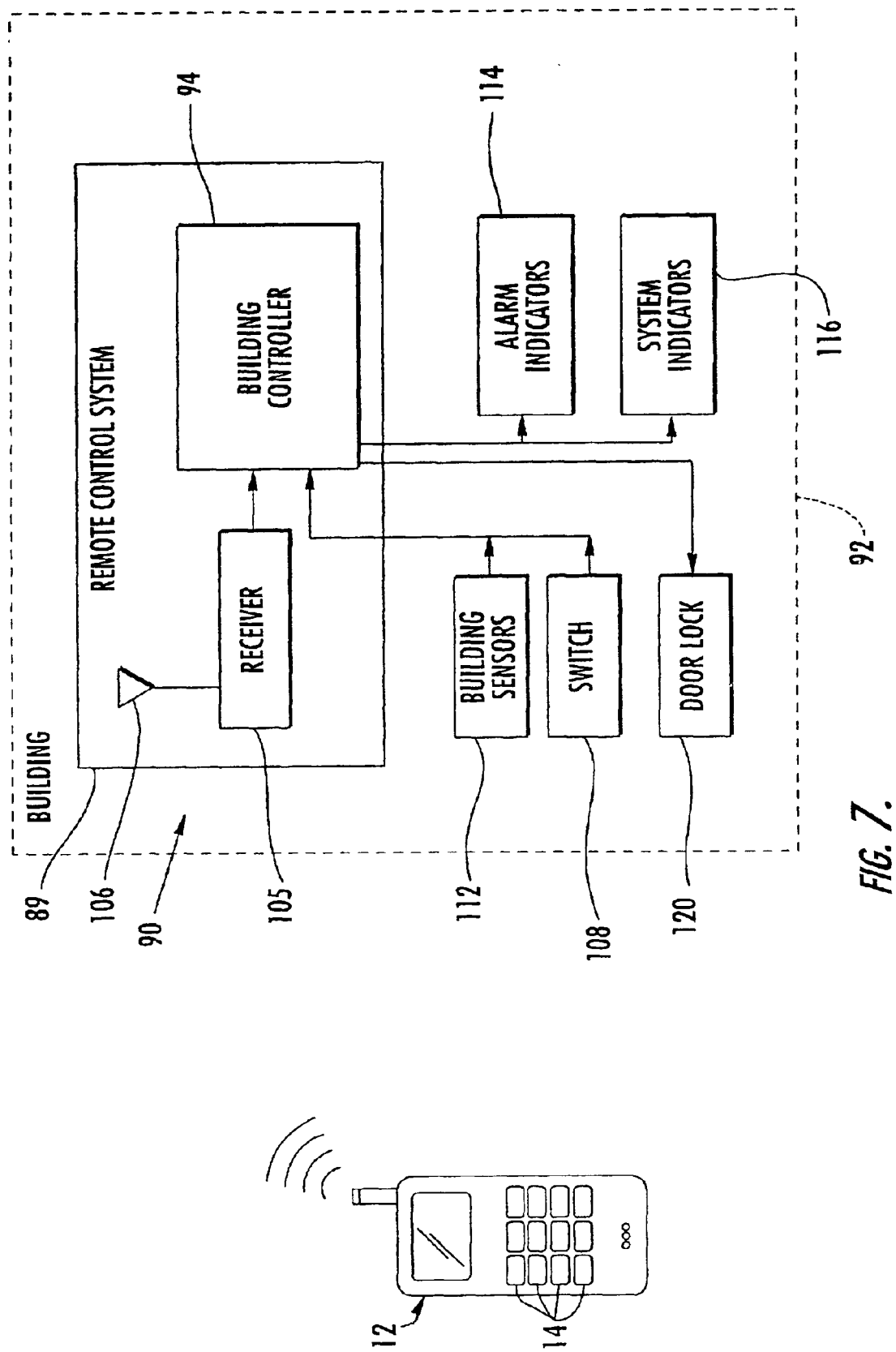
FIG. 7 is a schematic diagram of a remote control system for granting access to a building in accordance with the present invention.

Yet another illustrative embodiment of a remote control system 89 according to the invention is understood with reference to FIG. 7. The illustrated building security system 90 is to be operated directly via a cellular telephone 12 without using intervening cellular communications infrastructure. The cellular telephone includes a keypad 14 and a transmitter for transmitting signals relating to a command code entered from the keypad and a unique identification code for the cellular telephone.

The building security system 90 comprises a receiver 105 positioned at the building 92 for receiving signals directly from the cellular telephone 12 without using intervening cellular communications infrastructure. An antenna 106 is connected to the receiver 105. A building controller 94 is connected to the receiver 105 and is switchable between a learning mode (via switch 108) and an operating mode. When the building controller 94 is in the learning mode, it learns the unique identification code of a cellular telephone so that the cellular telephone is an authorized cellular telephone. When the building controller 94 is in the operating mode, it grants access to the building 92 responsive to signals received from the authorized cellular telephone.

The building controller 94 is also connected to building sensors 112. The building sensors 112 may be of a conventional switch or proximity sensor type as will be appreciated by those skilled in the art. The building controller 94 is also connected to alarm indicators 114 and system indicators 116. The alarm indicators 114 may include a local siren, or may include a telephone dialing circuit to contact a remote monitoring station. The system indicators 116 may include any of a number indicators, such as lights, audible tone generators, etc.

The building controller 94 is switchable between an armed mode for generating an alarm responsive to the building sensors 112, and a disarmed mode. The building controller 94 is also connected to at least at least one door lock 120, and wherein the building controller unlocks the door lock responsive to the signals received from the authorized cellular telephone 12.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. A vehicle remote control system to be operated directly via a cellular telephone without using intervening cellular communications infrastructure, the cellular telephone comprising an input device and a cellular telephone transmitter for transmitting cellular telephone signals via the cellular communications infrastructure and for alternately transmitting signals relating to a command code entered from the input device and a unique identification code for the cellular telephone, the vehicle remote control system comprising:
   a receiver positioned at the vehicle for receiving signals directly from the cellular telephone transmitter that is alternately used for transmitting cellular telephone signals via the cellular telephone infrastructure but without using intervening cellular communications infrastructure; and
   a controller positioned at the vehicle and being switchable between a learning mode and an operating mode, said controller when in the learning mode learning the unique identification code of a cellular telephone so that the cellular telephone is an authorized cellular telephone, said controller when in the operating mode controlling at least one vehicle function responsive to signals received from the cellular transmitter of the authorized cellular telephone and without using the intervening cellular telephone infrastructure.

2. A vehicle remote control system according to claim 1, wherein said controller cooperates with said receiver to learn the unique identification code of the cellular telephone by wireless reception from the cellular telephone.

3. A vehicle remote control system according to claim 2, wherein said receiver has a controllable sensitivity; and wherein said controller reduces the sensitivity of said receiver when in the learning mode.

4. A vehicle remote control system according to claim 1, wherein said receiver comprises a frequency scanning receiver for scanning available transmit frequencies of the authorized cellular telephone.

5. A vehicle remote control system according to claim 1, further comprising an electrical connector coupled to said controller and cooperating therewith to permit said controller to interface with the cellular telephone to learn the unique identification code of the cellular telephone.

6. A vehicle remote control system according to claim 1, wherein said controller comprises a security controller switchable between armed and disarmed modes; and wherein the at least one vehicle function comprises switching between armed and disarmed modes.

7. A vehicle remote control system according to claim 1, wherein said controller comprises a door lock controller; and wherein the at least one vehicle function comprises locking or unlocking at least one vehicle door.

8. A vehicle remote control system according to claim 1, wherein said controller comprises an engine starting controller; and wherein the at least one vehicle function comprises starting a vehicle engine.

9. A vehicle remote control system according to claim 1, further comprising a user operable switch connected to said controller; and wherein said controller is switchable to the learning mode responsive to said user operable switch.

10. A vehicle remote control system according to claim 1, further comprising a user operable switch connected to said controller; wherein said controller is connected to at least one vehicle device; and wherein said controller is switchable to the learning mode responsive to said user operable switch and responsive to at said at least one vehicle device.

11. A vehicle remote control system according to claim 1, wherein said controller is selectively responsive to less than seven digit command codes from the authorized cellular telephone.

12. A vehicle remote control system to be operated directly via a cellular telephone without using intervening cellular communications infrastructure, the cellular telephone comprising a keypad and a cellular telephone transmitter for transmitting cellular telephone signals via the cellular communications infrastructure and for alternately transmitting signals relating to a command code entered from the keypad and a unique identification code for the cellular telephone, the vehicle remote control system comprising:
   a receiver positioned at the vehicle for receiving signals directly from the cellular telephone transmitter that is alternately used for transmitting cellular telephone signals via the cellular telephone infrastructure but without using intervening cellular communications infrastructure;
   a controller positioned at the vehicle and being switchable between a learning mode and an operating mode, said controller when in the learning mode learning the unique identification code of a cellular telephone so that the cellular telephone is an authorized cellular telephone, said controller when in the operating mode controlling at least one vehicle function responsive to signals received from the cellular transmitter of the authorized cellular telephone and without using the intervening cellular telephone infrastructure; and
   an electrical connector coupled to said controller and cooperating therewith to permit said controller to interface with the cellular telephone to learn the unique identification code of the cellular telephone.

13. A vehicle remote control system according to claim 12, wherein said receiver comprises a frequency scanning receiver for scanning available transmit frequencies of the authorized cellular telephone.

14. A vehicle remote control system according to claim 12, wherein said controller comprises a security controller switchable between armed and disarmed modes; and wherein the at least one vehicle function comprises switching between armed and disarmed modes.

15. A vehicle remote control system according to claim 12, wherein said controller comprises a door lock controller; and wherein the at least one vehicle function comprises locking or unlocking at least one vehicle door.

16. A vehicle remote control system according to claim 12, wherein said controller comprises an engine starting controller; and wherein the at least one vehicle function comprises starting a vehicle engine.

17. A vehicle remote control system according to claim 12, further comprising a user operable switch connected to said controller; and wherein said controller is switchable to the learning mode responsive to said user operable switch.

18. A vehicle remote control system to be operated directly via a cellular telephone without using intervening cellular communications infrastructure, the cellular telephone comprising a keypad and a cellular telephone transmitter for transmitting cellular telephone signals via the cellular communications infrastructure and for alternately transmitting signals relating to a command code entered from the keypad and a unique identification code for the cellular telephone, the vehicle remote control system comprising:

a receiver positioned at the vehicle for receiving signals directly from the cellular telephone transmitter that is alternately used for transmitting cellular telephone signals via the cellular telephone infrastructure but without using intervening cellular communications infrastructure;

a controller positioned at the vehicle and being switchable between a learning mode and an operating mode, said controller when in the learning mode learning the unique identification code of a cellular telephone so that the cellular telephone is an authorized cellular telephone, said controller when in the operating mode controlling at least one vehicle function responsive to signals received from the cellular transmitter of the authorized cellular telephone and without using the intervening cellular telephone infrastructure; and said controller cooperating with said receiver to learn the unique identification code of the cellular telephone by wireless reception from the cellular telephone.

19. A vehicle remote control system according to claim 18, wherein said controller comprises a security controller switchable between armed and disarmed modes; and wherein the at least one vehicle function comprises switching between armed and disarmed modes.

20. A vehicle remote control system according to claim 18, wherein said controller comprises a door lock controller; and wherein the at least one vehicle function comprises locking or unlocking at least one vehicle door.

21. A vehicle remote control system according to claim 18, wherein said controller comprises an engine starting controller; and wherein the at least one vehicle function comprises starting a vehicle engine.

22. A vehicle remote control system according to claim 18, further comprising a user operable switch connected to said controller; and wherein said controller is switchable to the learning mode responsive to said user operable switch.

23. A method for vehicle remote control system directly via a cellular telephone without using intervening cellular communications infrastructure, the cellular telephone comprising an input device and a cellular telephone transmitter for transmitting cellular telephone signals via the cellular communications infrastructure and for alternately transmitting signals relating to a command code entered from the input device and a unique identification code for the cellular telephone, the method comprising:

receiving signals directly from the cellular telephone transmitter that is alternately used for transmitting cellular telephone signals via the cellular telephone infrastructure at the vehicle but without using intervening cellular communications infrastructure;

switching a controller positioned at the vehicle to a learning mode and learning the unique identification code of a cellular telephone so that the cellular telephone is an authorized cellular telephone; and switching the controller to an operating mode and controlling at least one vehicle function responsive to signals received from the cellular transmitter of the authorized cellular telephone and without using the intervening cellular telephone infrastructure.

24. A method according to claim 23, wherein the controller cooperates with the receiver to learn the unique identification code of the cellular telephone by wireless reception from the cellular telephone.

25. A method according to claim 24, further comprising reducing sensitivity of the receiver when in the learning mode.

26. A method according to claim 23, wherein the receiver comprises a frequency scanning receiver for scanning available transmit frequencies of the authorized cellular telephone.

27. A method according to claim 23, further comprising using an electrical connector coupled to the controller and cooperating therewith to permit the controller to interface with the cellular telephone to learn the unique identification code of the cellular telephone.

28. A method according to claim 23, wherein the controller comprises a security controller switchable between armed and disarmed modes; and wherein the at least one vehicle function comprises switching between armed and disarmed modes.

29. A method according to claim 23, wherein the controller comprises a door lock controller; and wherein the at least one vehicle function comprises locking or unlocking at least one vehicle door.

30. A method according to claim 23, wherein the controller comprises an engine starting controller; and wherein the at least one vehicle function comprises starting a vehicle engine.

31. A method according to claim 23, further comprising a user operable switch connected to the controller; and wherein the controller is switchable to the learning mode responsive to the user operable switch.

32. A method according to claim 23, wherein the controller is selectively responsive to less than seven digit command codes from the authorized cellular telephone.

33. A vehicle remote control system to be operated directly via a cellular telephone without using intervening cellular communications infrastructure, the cellular telephone comprising an input device and a transmitter for transmitting signals relating to a command code entered from the input device and a unique identification code for the cellular telephone, the vehicle remote control system comprising:

a receiver positioned at the vehicle for receiving signals directly from the cellular telephone without using intervening cellular communications infrastructure; and a controller positioned at the vehicle and being switchable between a learning mode and an operating mode, said controller when in the learning mode learning the unique identification code of a cellular telephone so that the cellular telephone is an authorized cellular telephone, said controller when in the operating mode controlling at least one vehicle function responsive to signals received from the authorized cellular telephone;

said controller cooperating with said receiver to learn the unique identification code of the cellular telephone by wireless reception from the cellular telephone;

said receiver having controllable sensitivity and said controller reducing the sensitivity of said receiver when in the learning mode.

34. A vehicle remote control system according to claim 33, wherein said receiver comprises a frequency scanning receiver for scanning available transmit frequencies of the authorized cellular telephone.

35. A vehicle remote control system according to claim 33, further comprising an electrical connector coupled to said controller and cooperating therewith to permit said controller to interface with the cellular telephone to learn the unique identification code of the cellular telephone.

36. A vehicle remote control system according to claim 33, wherein said controller comprises a security controller switchable between armed and disarmed modes; and wherein the at least one vehicle function comprises switching between armed and disarmed modes.

37. A vehicle remote control system according to claim 33, wherein said controller comprises a door lock controller; and wherein the at least one vehicle function comprises locking or unlocking at least one vehicle door.

38. A vehicle remote control system according to claim 33, wherein said controller comprises an engine starting controller; and wherein the at least one vehicle function comprises starting a vehicle engine.

39. A vehicle remote control system according to claim 33, further comprising a user operable switch connected to said controller; and wherein said controller is switchable to the learning mode responsive to said user operable switch.

40. A vehicle remote control system according to claim 33, further comprising a user operable switch connected to said controller; wherein said controller is connected to at least one vehicle device; and wherein said controller is switchable to the learning mode responsive to said user operable switch and responsive to at said at least one vehicle device.

* * * * *

UNITED STATES PATENT AND TRADEMARK OFFICE
CERTIFICATE OF CORRECTION

PATENT NO.    : 6,873,824 B2
DATED         : March 29, 2005
INVENTOR(S)   : Flick It is certified that error appears in the above-identified patent and that said Letters Patent is hereby corrected as shown below:

Column 6,
Line 14, delete "30" insert -- 30' --.

Column 7,
Line 36, delete "18-" insert -- 18" --.

Column 9,
Line 25, delete "at least at least" insert -- at least --.

Signed and Sealed this

Thirtieth Day of August, 2005

JON W. DUDAS
*Director of the United States Patent and Trademark Office*